(12) United States Patent
Lin et al.

(10) Patent No.: US 7,864,815 B2
(45) Date of Patent: Jan. 4, 2011

(54) METHODS AND APPARATUS FOR PERFORMING PROTOCOL DATA UNIT HEADER RE-SYNCHRONIZATION IN A COMMUNICATION SYSTEM

(75) Inventors: Chu-Ming Lin, Hsinchu (TW); Jian-Bang Lin, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 284 days.

(21) Appl. No.: 12/099,118

(22) Filed: Apr. 7, 2008

(65) Prior Publication Data

US 2009/0252031 A1    Oct. 8, 2009

(51) Int. Cl.
*H04J 3/06* (2006.01)
(52) U.S. Cl. ...................... 370/509; 370/350
(58) Field of Classification Search ............ 370/394, 370/503–516
See application file for complete search history.

(56) References Cited

U.S. PATENT DOCUMENTS

2007/0076314 A1* 4/2007 Rigney ................... 360/51
2008/0002567 A1* 1/2008 Bourlas et al. ........... 370/208

\* cited by examiner

*Primary Examiner*—Ricky Ngo
*Assistant Examiner*—Pao Sinkantarakorn
(74) *Attorney, Agent, or Firm*—Winston Hsu; Scott Margo

(57) ABSTRACT

A method for performing protocol data unit (PDU) header re-synchronization in a communication system includes: when a header check sequence (HCS) fail occurs, detecting whether there exists a valid HCS in a first portion of first data by utilizing at least one detection window, where the first data is derived from an input signal received by the communication system; and when a valid HCS is detected in the first portion of the first data, detecting whether at least a second portion of the first data matches a connection identifier (CID) to determine whether the PDU header re-synchronization is completed.

13 Claims, 6 Drawing Sheets

METHODS AND APPARATUS FOR PERFORMING PROTOCOL DATA UNIT HEADER RE-SYNCHRONIZATION IN A COMMUNICATION SYSTEM

BACKGROUND

The present invention relates to a communication, and more particularly, to methods and apparatus for performing protocol data unit (PDU) header re-synchronization in a communication system.

FIG. 1 illustrates a frame structure typically utilized in a wireless communication system such as a Worldwide Interoperability Microwave Access (WiMAX) communication system according to the related art, where the WiMAX communication system may communicate by utilizing downlink (DL) bursts and uplink (UL) bursts according to the frame structure shown in FIG. 1. An example of a DL burst format for the frame structure shown in FIG. 1 is illustrated as shown in FIG. 2. In addition, examples of a medium access control (MAC) header of a MAC PDU typically utilized in the DL burst format shown in FIG. 2 are further illustrated as shown in FIG. 3.

According to the related art, when an error related to the MAC header shown in FIG. 3 occurs (for example, the MAC header shown in FIG. 3 is not decoded correctly), the length of the payload shown in FIG. 3 may be incorrect or unknown since the content in the field "LEN MSB(3)" and the content in the field "LEN LSB(8)" are not guaranteed in the situation where HT=0. As a result, it takes the WiMAX communication system more time to recover to normal operation; that is, to be in a synchronization state for deriving correct data carried by the DL bursts. More particularly, when it is designed to utilize the CRC32 information (which exists at the end of the MAC PDU, as shown in FIG. 3) in order to recover to the normal operation mentioned above, the WiMAX communication system typically needs to capture a whole MAC PDU. Thus, memory access corresponding to capturing a whole MAC PDU of a specific size (e.g. 2K bytes) into a data buffer is required whenever the same error occurs, even though the data temporarily captured within the data buffer may be not related to a connection under consideration.

In addition, the CRC32 information may be optional for some MAC PDUs. That is, if the WiMAX communication system waits for the appearance of the CRC32 information of another PDU derived in the future, some important data may be omitted before the WiMAX communication system recovers to the normal operation mentioned above. Therefore, the performance of the WiMAX communication system according to the related art is poor, since its operation is neither reliable nor time-efficient.

SUMMARY

It is therefore an objective of the claimed invention to provide methods and apparatus for performing protocol data unit (PDU) header re-synchronization in a communication system to solve the above-mentioned problem.

It is another objective of the claimed invention to provide methods and apparatus for performing PDU header re-synchronization in a communication system to reduce a PDU error rate and to improve the performance of the communication system by re-synchronizing a boundary of a PDU corresponding to a connection under consideration.

It is another objective of the claimed invention to provide methods and apparatus for performing PDU header re-synchronization in a communication system, so a re-synchronization state may be entered as soon as possible by utilizing a PDU boundary match condition of a PDU corresponding to a connection under consideration and by ignoring all the other PDUs.

An exemplary embodiment of a method for performing PDU header re-synchronization in a communication system comprises: when a header check sequence (HCS) fail occurs, detecting whether there exists a valid HCS in a first portion of first data by utilizing at least one detection window, where the first data is derived from an input signal received by the communication system; and when a valid HCS is detected in the first portion of the first data, detecting whether at least a second portion of the first data matches a connection identifier (CID) to determine whether the PDU header re-synchronization is completed.

An exemplary embodiment of an apparatus for performing PDU header re-synchronization in a communication system comprises: a storage unit for temporarily storing first data, where the first data is derived from an input signal received by the communication system; a HCS detection circuit, coupled to the storage unit, for performing HCS detection, where the HCS detection circuit is capable of detecting whether there exists a valid HCS in a first portion of the first data by utilizing at least one detection window; a CID detection circuit, coupled to the storage unit, for performing CID detection, where the CID detection circuit is capable of detecting whether at least a second portion of the first data matches a CID; and a controller, coupled to the HCS detection circuit and the CID detection circuit, for controlling the HCS detection circuit to perform the HCS detection when an HCS fail occurs and further controlling the CID detection circuit to perform the CID detection when a valid HCS is detected in the first portion of the first data, in order to determine whether the PDU header re-synchronization is completed.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 4:
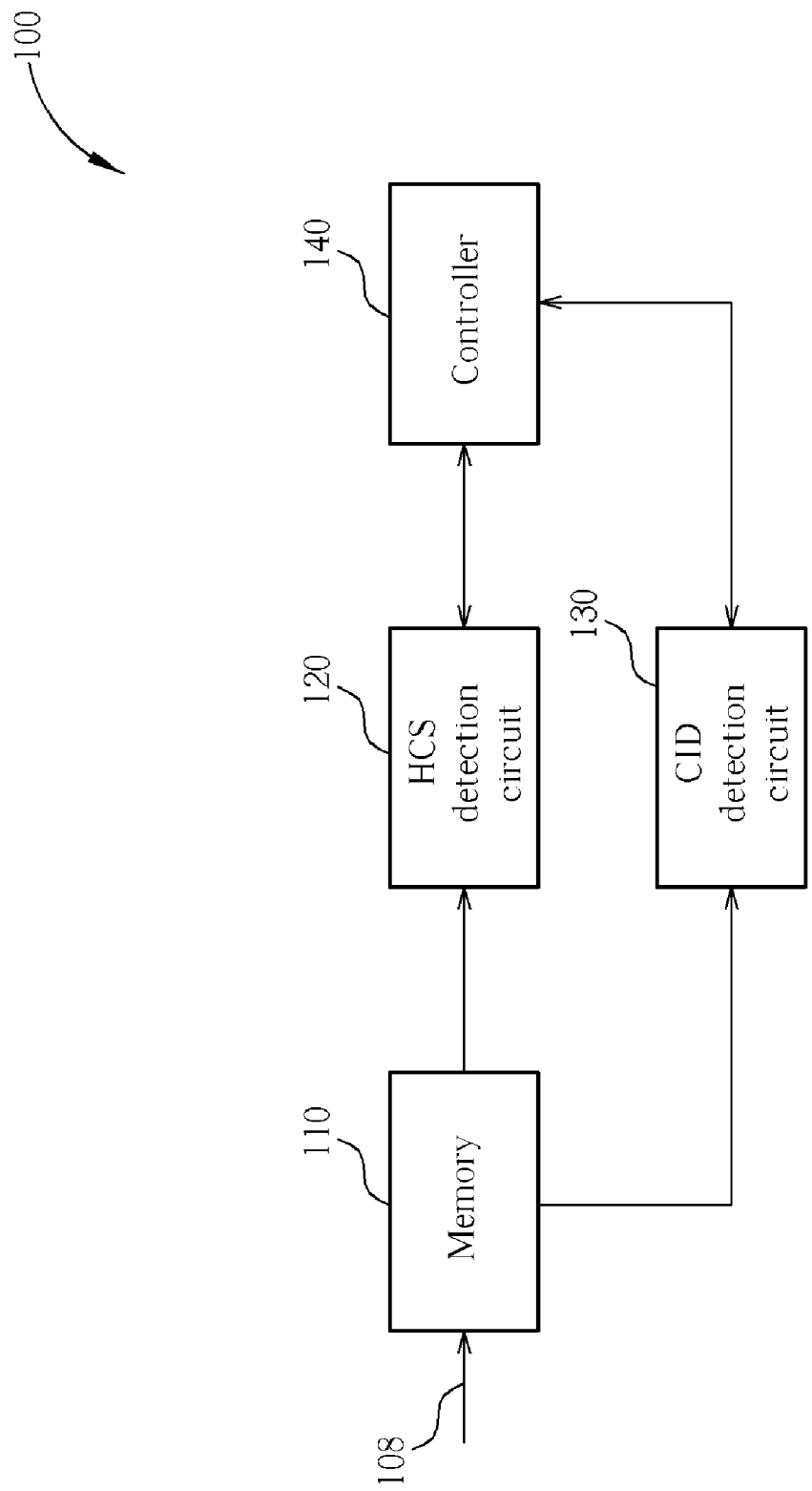
FIG. 4 is a diagram of an apparatus for performing PDU header re-synchronization in a communication system according to one embodiment of the present invention.

Please refer to FIG. 4. FIG. 4 is a diagram of an apparatus 100 for performing PDU header re-synchronization in a communication system such as a wireless communication system according to one embodiment of the present invention, where the wireless communication system of this embodiment complies with Worldwide Interoperability Microwave Access (WiMAX) specifications. As shown in FIG. 4, the apparatus 100 comprises a storage unit such as a memory 110, a header check sequence (HCS) detection circuit 120, a connection identifier (CID) detection circuit 130, and a controller 140, where the controller 140 can be implemented to comprise a state machine for switching between different states.

Figure 1:
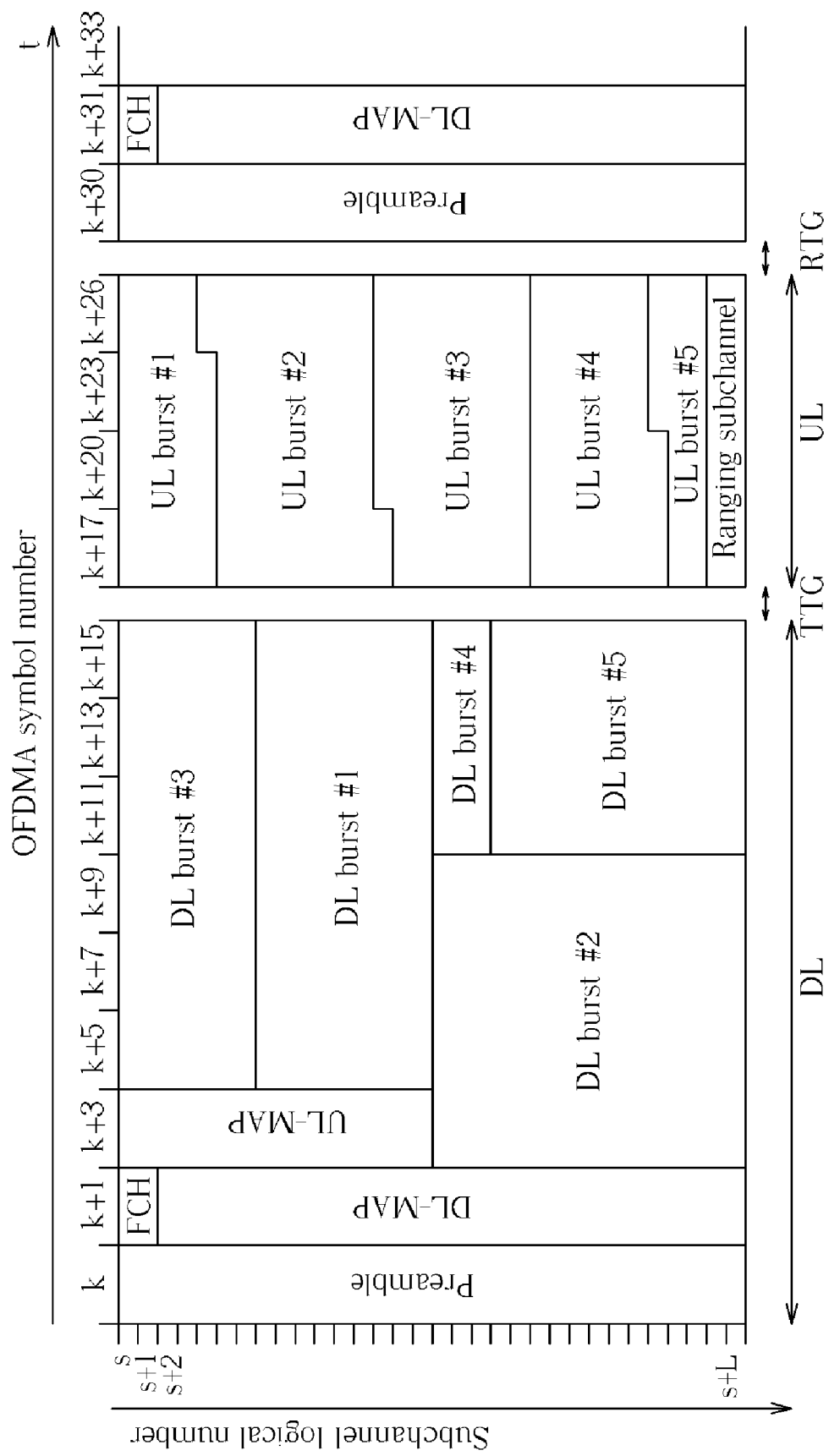
FIG. 1 illustrates a frame structure typically utilized in a communication system such as a Worldwide Interoperability Microwave Access (WiMAX) communication system according to the related art.
Figure 2:
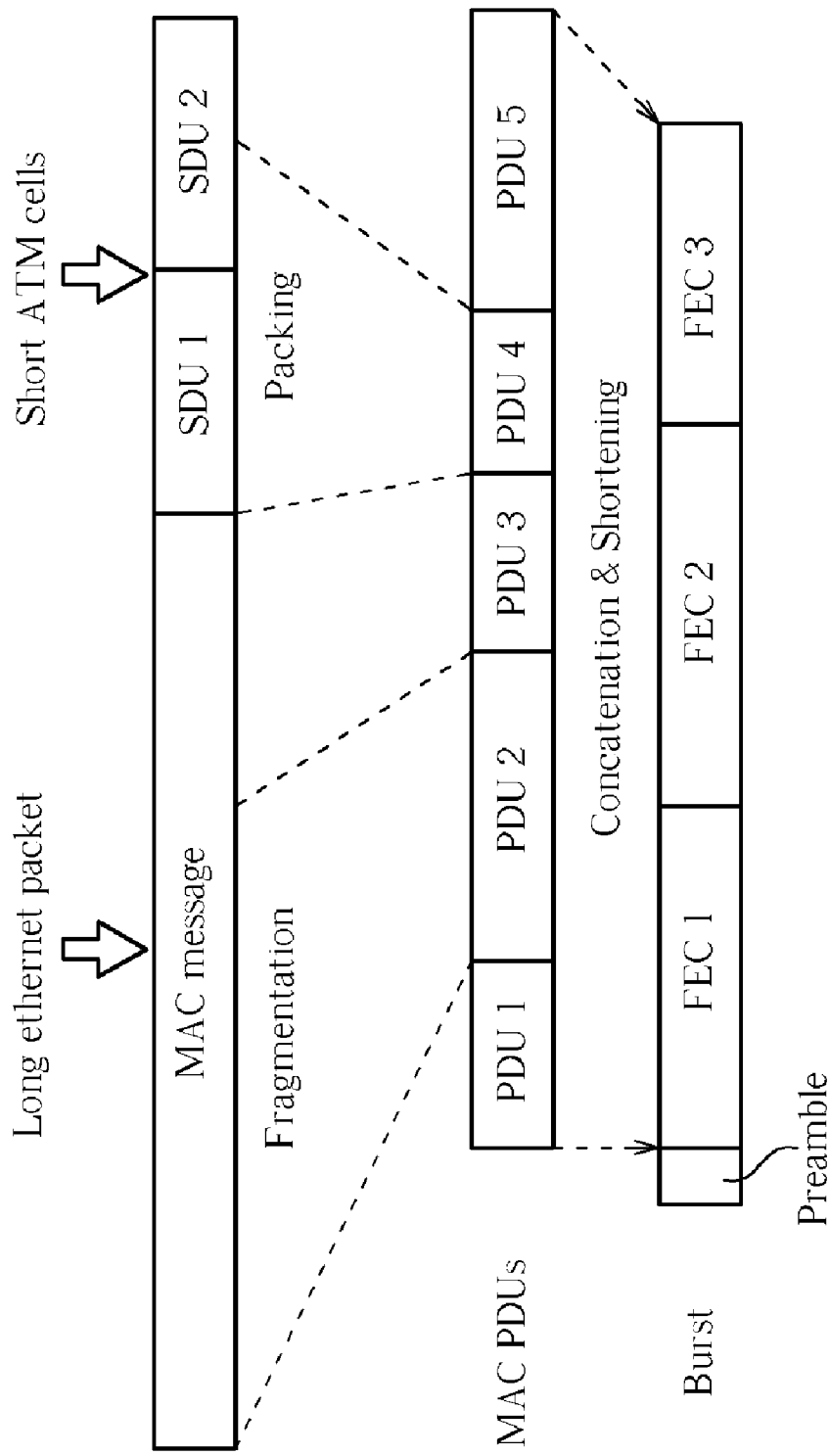
FIG. 2 illustrates an example of a downlink (DL) burst format for the frame structure shown in FIG. 1.
Figure 3:
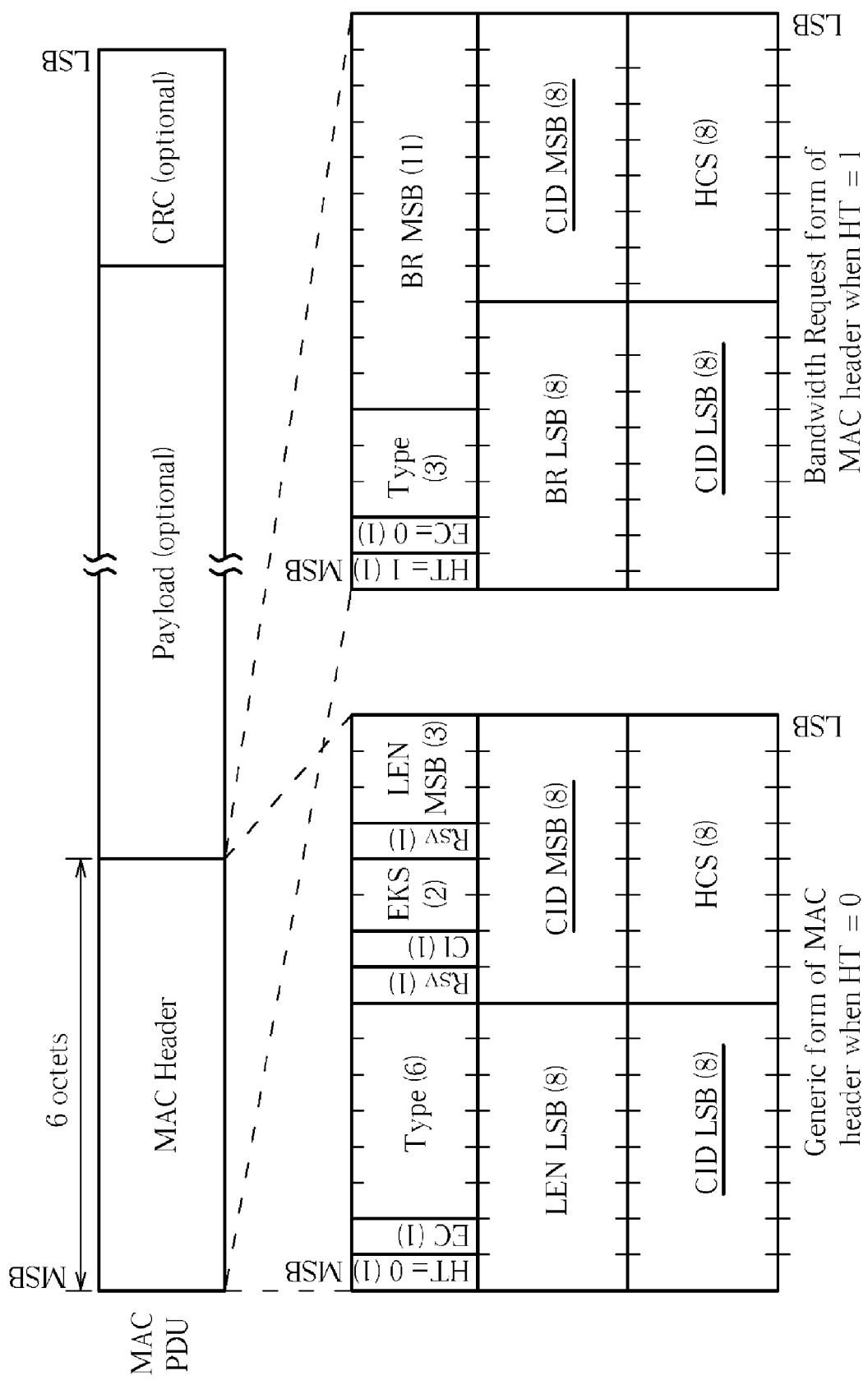
FIG. 3 illustrates examples of a medium access control (MAC) header of a MAC protocol data unit (PDU) typically utilized in the DL burst format shown in FIG. 2.

According to this embodiment, the memory 110 is capable of temporarily storing first data carried by an input signal 108, where the first data is derived from an input signal such as a wireless signal received by the wireless communication system. In addition, the HCS detection circuit 120 is capable of performing HCS detection, where the HCS detection circuit 120 is capable of detecting whether there exists a valid HCS (such as that complying with the HCS(8) field shown in FIG. 3) in a first portion of the first data by utilizing at least one detection window. The CID detection circuit 130 of this embodiment is utilized for performing CID detection, where the CID detection circuit 130 is capable of detecting whether at least a second portion of the first data matches a CID. Additionally, the controller 140 is capable of controlling the HCS detection circuit 120 to perform the HCS detection when an HCS fail occurs and further controlling the CID detection circuit 130 to perform the CID detection when a valid HCS is detected in the first portion of the first data, in order to determine whether the PDU header re-synchronization has been completed.

Figure 5:
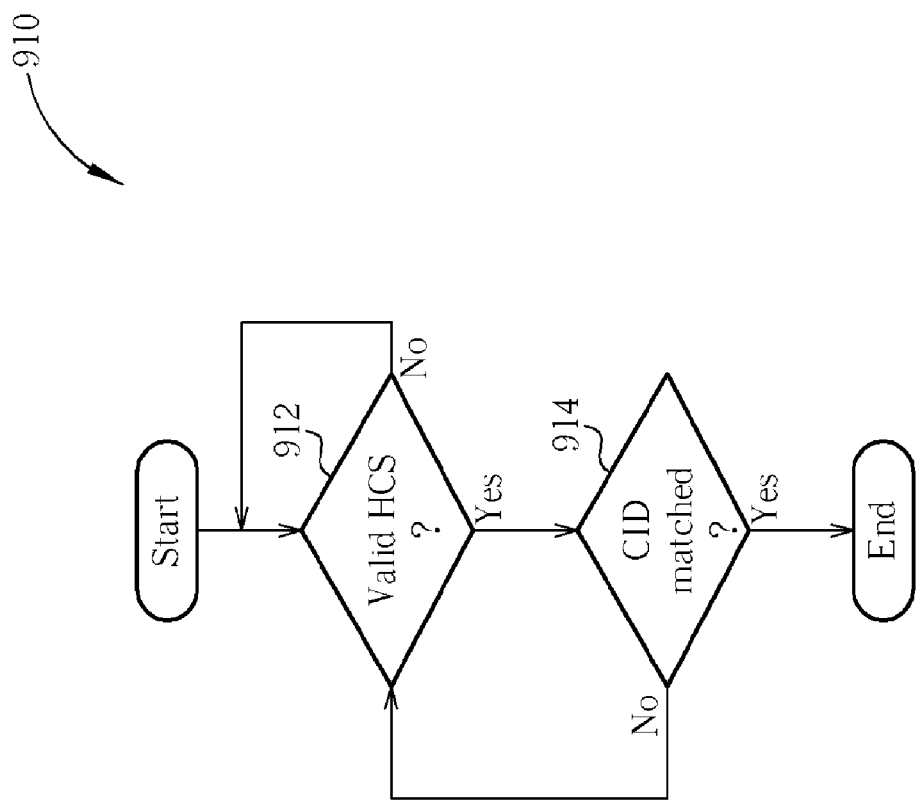
FIG. 5 is a flowchart of a method for performing PDU header re-synchronization in a communication system according to a first embodiment of the present invention.

FIG. 5 is a flowchart of a method 910 for performing PDU header re-synchronization in a communication system such as a wireless communication system according to a first embodiment of the present invention, where the method 910 is typically performed when an HCS fail occurs. The method 910 can be implemented by utilizing the apparatus 100 shown in FIG. 4, and can further be described as follows.

In Step 912, under the control of the controller 140, the HCS detection circuit 120 detects whether there exists a valid HCS in the first portion of the first data by utilizing at least one detection window, where a data amount of the first data corresponds to a size of the detection window and is equal to that of a header of a PDU derived from the wireless signal. In Step 912, the state machine within the controller 140 is in an HCS detection state. If the HCS detection circuit 120 determines that there exists a valid HCS in the first portion of first data, the state machine within the controller 140 switches into a CID detection state, and therefore, Step 914 is entered; otherwise, Step 912 is re-entered for repeating the HCS detection regarding slightly different data comprising partial data of the first data, where the slightly different data is also derived from the wireless signal and temporarily stored in the storage unit (i.e. the memory 110 in this embodiment).

In Step 914, under the control of the controller 140, the CID detection circuit 130 detects whether at least a second portion of the first data matches a CID to determine whether the PDU header re-synchronization is completed. If the second portion of the first data matches the CID, the controller 140 determines that the PDU header re-synchronization is complete, and therefore, the end of the flowchart shown in FIG. 5 is reached; otherwise (i.e. the controller 140 determines that the PDU header re-synchronization is not completed), Step 912 is re-entered, so the controller 140 may control the HCS detection circuit 120 to repeat the HCS detection and/or control the CID detection circuit 130 to repeat the CID detection regarding slightly different data comprising partial data of the first data, where the slightly different data is also derived from the wireless signal and temporarily stored in the storage unit (i.e. the memory 110 in this embodiment).

According to this embodiment, in Step 912, the HCS detection circuit 120 detects whether there exists a valid HCS in the first portion of the first data by calculating an HCS value according to a third portion of the first data and by further detecting whether the first portion of the first data matches the HCS value. If the first portion of the first data matches the HCS value, the HCS detection circuit 120 determines that there exists a valid HCS in the first portion of first data. In this embodiment, the wireless communication system complies with WiMAX specifications, the data amount of the first portion of the first data mentioned above is equal to one byte, and the size of each detection window is not less than six bytes.

Figure 6:
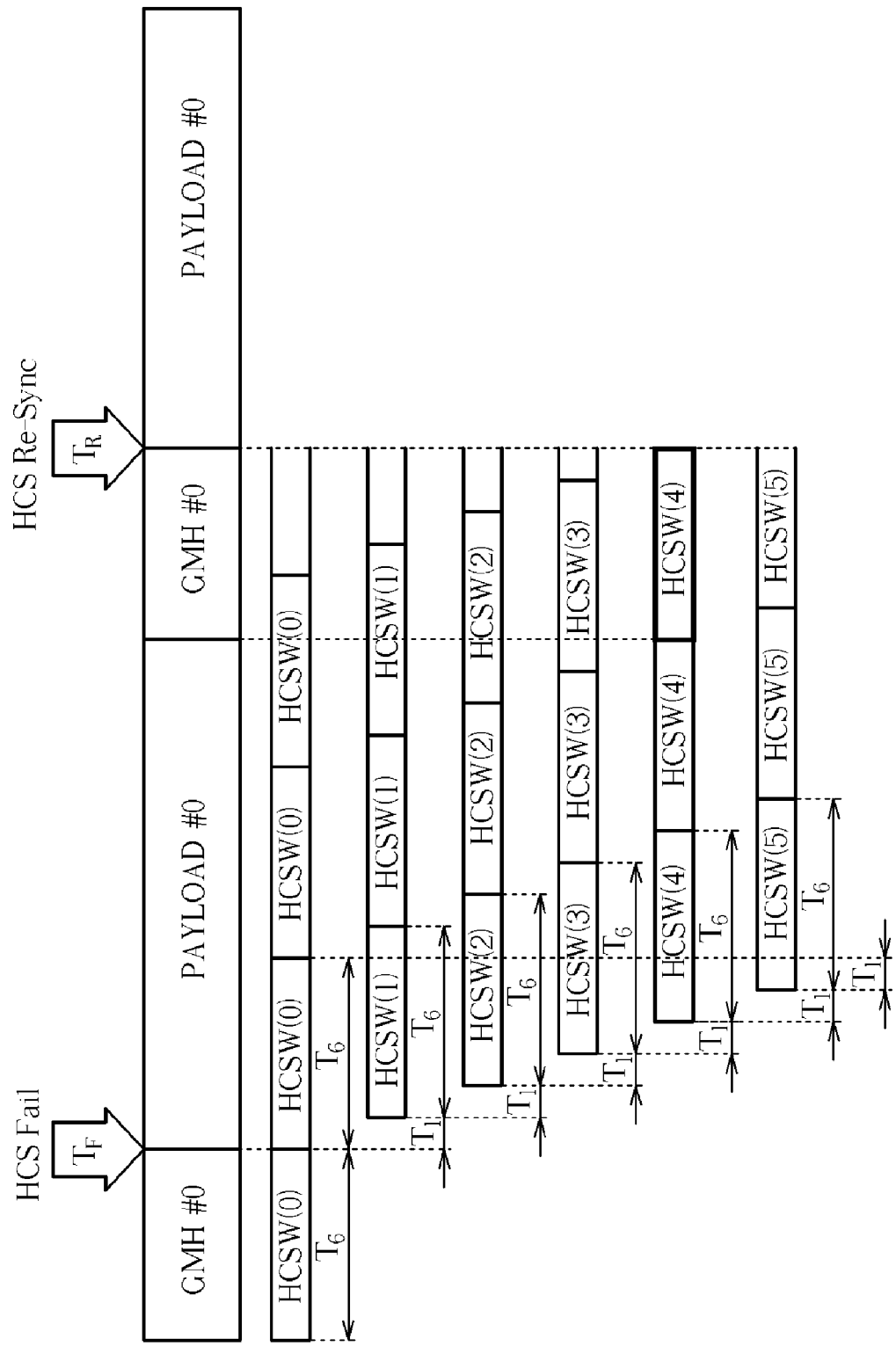
FIG. 6 illustrates a plurality of detection windows utilized by the method shown in FIG. 5 according to one embodiment of the present invention.

More particularly, in this embodiment, the HCS detection circuit 120 detects whether there exists a valid HCS in the first portion of the first data by utilizing a plurality of detection windows, such as the detection windows HCSW(0), HCSW (1), . . . , and HCSW(5) shown in FIG. 6, starting from a time point $T_F$ representing the beginning of the HCS fail. The detection windows are enabled one by one, and every two subsequently enabled detection windows out of the plurality of detection windows correspond to a same predetermined delay amount $T_1$, which represents a one-byte delay in this embodiment. Please note that the predetermined delay amount $T_1$ represents a one-byte delay, which is only for illustration purposes in this embodiment, and should not be taken as a limitation of the present invention. Instead, the predetermined delay amount $T_1$ could be selected as one of various lengths depending on the design criteria. In this embodiment, the data amount of the first data is equal to six bytes, and the predetermined delay amount is equal to the data amount of the first portion of the first data, i.e. one byte. Additionally, as shown in FIG. 6, the subsequently enabled detection windows have a common size of six bytes, and are repeatedly utilized until a time point $T_R$, which represents the beginning of an HCS re-synchronization state in this embodiment. Thus, the plurality of detection windows is subsequently utilized repeatedly according to a period of $T_6$ until the PDU header re-synchronization is completed.

Accordingly, in this embodiment, the aforementioned first portion of the first data corresponds to the last byte within the six bytes of the first data, the aforementioned second portion of the first data corresponds to the fourth and the fifth bytes within the six bytes of the first data, and the aforementioned third portion of the first data corresponds to the first five bytes within the six bytes of the first data. Thus, with the examples of the MAC header of the MAC PDU shown in FIG. 3 in mind, once a valid HCS is detected within the first data enclosed by a specific detection window out of the detection windows mentioned above, if the content of the predicted CID field (i.e. the fourth and the fifth bytes within the six bytes of the first data enclosed by the specific detection window) matches a CID corresponding to a connection under consideration, a PDU boundary match condition is reached, and therefore, the PDU header re-synchronization is completed. For example, in the situation shown in FIG. 6, the specific detection window is the last one of the repeated utilized detection windows HCSW(4), i.e. the detection window illustrated with bold lines.

Please note that, in this embodiment, the false alarm possibility $P_{fa}$ of the PDU boundary match condition can be described as follows:

$$P_{fa}=(1/256)*(1/(2^{\wedge}16))*N_{CID};$$

where the parameter $N_{CID}$ represents the number of CIDs to be received. Typically, the parameter $N_{CID}$ is not greater than 256.

According to a variation of the first embodiment, the wireless communication system may not completely comply with WiMAX specifications. However, the number of detection windows, the size of each detection window, the data amount of the first data, the data amount of the first portion of the first data, and the predetermined delay amount can be varied according to new specifications as needed, so implementation of the present invention will not be hindered.

In contrast to the related art, the present invention methods and apparatus neither need to capture a whole PDU nor utilize the CRC32 information that protects the whole PDU. Therefore, the performance of the present invention methods and apparatus is greater than the related art.

It is another advantage of the claimed invention that the present invention methods and apparatus may re-synchronize a PDU boundary on-the-fly without missing a PDU boundary match condition. Therefore, the performance of the present invention methods and apparatus is greater than the related art.

It is another advantage of the claimed invention that, according to the first embodiment, the present invention methods and apparatus only need six CRC8 generator/checker logic circuits corresponding to six detection windows. Therefore, the hardware architecture required by the present invention is less complex than the related art.

Those skilled in the art will readily observe that numerous modifications and alterations of the device and method may be made while retaining the teachings of the invention.

What is claimed is:

1. A method for performing protocol data unit (PDU) header re-synchronization in a communication system, the method comprising:
   when a header check sequence (HCS) fail occurs, detecting whether there exists a valid HCS in a first portion of first data by utilizing at least one detection window, wherein the first data is derived from an input signal received by the communication system; and
   when a valid HCS is detected in the first portion of the first data, detecting whether at least a second portion of the first data matches a connection identifier (CID) to determine whether the PDU header re-synchronization is completed;
   wherein the step of detecting whether at least the second portion of the first data matches the CID to determine whether the PDU header re-synchronization is completed comprises:
      when the second portion of the first data matches the CID, determining that the PDU header re-synchronization is completed.

2. The method of claim 1, wherein a data amount of the first data is substantially equal to that of a header of a PDU derived from the input signal.

3. The method of claim 1, wherein a data amount of the first data corresponds to a size of the detection window.

4. The method of claim 1, wherein the step of detecting whether there exists a valid HCS in the first portion of the first data further comprises:
   calculating an HCS value according to a third portion of the first data; and
   detecting whether the first portion of the first data matches the HCS value.

5. The method of claim 4, wherein the step of detecting whether there exists a valid HCS in the first portion of the first data further comprises:
   when the first portion of the first data matches the HCS value, determining that there exists a valid HCS in the first portion of the first data.

6. The method of claim 1, further comprising:
   when the PDU header re-synchronization is not completed, repeating the HCS detection step and/or the CID detection step regarding different data that is derived from the input signal.

7. The method of claim 6, wherein the different data comprises partial data of the first data.

8. The method of claim 1, wherein the at least one detection window comprises a plurality of detection windows.

9. The method of claim 8, wherein the plurality of detection windows is subsequently utilized repeatedly until the PDU header re-synchronization is completed.

10. The method of claim 1, wherein the communication system complies with Worldwide Interoperability Microwave Access (WiMAX) specifications.

11. An apparatus for performing protocol data unit (PDU) header re-synchronization in a communication system, the apparatus comprising:
    a storage unit for temporarily storing first data, wherein the first data is derived from an input signal received by the communication system;
    a header check sequence (HCS) detection circuit, coupled to the storage unit, for performing HCS detection, wherein the HCS detection circuit is capable of detecting whether there exists a valid HCS in a first portion of the first data by utilizing at least one detection window;
    a connection identifier (CID) detection circuit, coupled to the storage unit, for performing CID detection, wherein the CID detection circuit is capable of detecting whether at least a second portion of the first data matches a CID; and
    a controller, coupled to the HCS detection circuit and the CID detection circuit, for controlling the HCS detection circuit to perform the HCS detection when an HCS fail occurs and further controlling the CID detection circuit to perform the CID detection when a valid HCS is detected in the first portion of the first data, in order to determine whether the PDU header re-synchronization is completed;
    wherein when the second portion of the first data matches the CID, the controller determines that the PDU header re-synchronization is completed.

12. The apparatus of claim 11, wherein the HCS detection circuit detects whether there exists a valid HCS in the first portion of the first data by calculating an HCS value according to a third portion of the first data and by further detecting whether the first portion of the first data matches the HCS value.

13. The apparatus of claim 11, wherein when the PDU header re-synchronization is not completed, the controller controls the HCS detection circuit to repeat the HCS detection and/or controls the CID detection circuit to repeat the CID detection regarding different data comprising partial data of the first data; and the slightly different data is derived from the input signal and temporarily stored in the storage unit.

* * * * *